United States Patent [19]
Burack et al.

[11] Patent Number: 6,114,426
[45] Date of Patent: Sep. 5, 2000

[54] PRESSURE-SENSITIVE FLAME RETARDANT ADHESIVE

[75] Inventors: John Joseph Burack, Toms River, N.J.; Peter A. Yurcick, Columbus, Ohio

[73] Assignee: Lucent Technologies, Inc., Murray Hill, N.J.

[21] Appl. No.: 08/974,914

[22] Filed: Nov. 20, 1997

[51] Int. Cl.[7] .................................................. C08K 3/10
[52] U.S. Cl. ........................ 524/409; 524/457; 526/278
[58] Field of Search ............................. 526/278; 524/409, 524/457

[56] References Cited

U.S. PATENT DOCUMENTS

| | | |
|---|---|---|
| 3,515,578 | 6/1970 | Tomita et al. . |
| 3,579,490 | 5/1971 | Kordzinski et al. . |
| 5,066,752 | 11/1991 | Favstritsky et al. . |
| 5,100,986 | 3/1992 | Favstritsky et al. . |
| 5,189,126 | 2/1993 | Bernard ..................................... 526/278 |
| 5,258,438 | 11/1993 | Suzuki et al. ............................ 524/409 |
| 5,331,040 | 7/1994 | Lee .......................................... 524/409 |
| 5,438,096 | 8/1995 | Wang et al. . |

FOREIGN PATENT DOCUMENTS

| | | | |
|---|---|---|---|
| 0304214 | 2/1989 | European Pat. Off. ................ | 524/409 |
| 62-153373 | 7/1987 | Japan ...................................... | 524/409 |
| 2-228348 | 9/1990 | Japan ...................................... | 524/409 |

*Primary Examiner*—Bernard Lipman
*Assistant Examiner*—N. Sarofim
*Attorney, Agent, or Firm*—Mathews, Collins, Shepherd & Gould, P.A.

[57] ABSTRACT

A pressure-sensitive, flame-retardant adhesive is disclosed comprising a composition fabricated with the polymerization of acrylic esters, dibromostyrene, and vinyl phosphonic acid, with or without acrylic acid, mixed with dispersions of antimony trioxide. The adhesive composition preferably is an emulsion polymer fabricated with dibromostyrene, 2-ethylhexyl acrylate, n-butyl acrylate, and vinyl phosphonic acid, mixed with $Sb_2O_3$ in an approximate ratio of 100 parts polymer per about 8–12 parts $Sb_2O_3$. Preferred polymers are those containing at least about 11.6% to 15.6% bromine and from 0.25 to 2.5% phosphorous. The adhesive is particularly advantageous in fabricating optical circuit devices.

19 Claims, 1 Drawing Sheet

PRESSURE-SENSITIVE FLAME RETARDANT ADHESIVE

FIELD OF THE INVENTION

The present invention relates to a pressure-sensitive, flame-retardant adhesive and particularly to an adhesive composition comprising a solution or emulsion polymerization of one or more acrylic esters, dibromostyrene, and vinyl phosphonic acid, compounded with antimony trioxide. With solution polymerization, acrylic acid also is incorporated into the polymerization mixture.

BACKGROUND OF THE INVENTION

A pressure-sensitive adhesive can be defined as a material which, in dry form, is aggressively and permanently tacky at room temperature so that it may firmly bond a variety of dissimilar surfaces upon contact without need of more than finger or hand pressure (low pressure). Molecular weights of polymers used as pressure-sensitive adhesives cover a broad range depending on their type, composition, structure, and method of polymerization. They are available in a variety of base chemistries and advantageously are formulated to have a particular balance of tack, adhesive, cohesive, and elastic properties, together with good thermal and chemical stability. They are available both as emulsion (latex) and solution polymers. Properties such as bond strength, shear strength, and tack may be adjusted by changing the molecular weight and chemistry of the polymers or by adding fillers or plasticizers.

The tack of the adhesive refers to its ability to form an instantaneous bond by flowing and wetting-out of the substrate with virtually no applied pressure. Tack can be measured by a variety of methods which are known in the field including loop tack, rolling ball tack, or the like. A number of test methods known in the field are identified as the Pressure Sensitive Tape Council (PSTC) Test Methods, which include a PSTC-5 quick stick tack test. The adhesive properties refer to the ultimate bond realized over a time frame under a specified lamination pressure. A PSTC-1 test comprises a 180 degree peel adhesion test using stainless steel panels and a four and one-half pound rubber roller for contact pressure. Adhesion tests are frequently carried out after 0, 15 minute, 24 hour, 72 hour, and 168 hour dwell times at specified conditions of temperature and humidity. An increase in adhesion with time is indicative of the relative "wet out" of the adhesive. The cohesion reflects the internal strength of the pressure-sensitive adhesive and is measured by shear strength tests, such as PSTC-7 (a dead load shear test) and other tests known in the field including lap shears, shear adhesion failure temperature (SAFT), and Williams plasticity (compression resistance).

Acrylic pressure-sensitive adhesives are soft, permanently tacky polymers preferably fabricated to have glass transition temperatures ($T_g$) of about −15° C. to −55° C., as discussed in U.S. Pat. No. 3,579,490 issued May 18, 1971, to Kordinzinski et als., entitled "Method of Producing Resins for Use in Adhesives," which is hereby incorporated by reference. The glass transition temperature ($T_g$) is the temperature at which the polymer changes from a hard, glassy material to a soft, rubbery material. Acrylic pressure-sensitive adhesives have specific attributes that increase their utility in various applications. Their beneficial attributes include resistance to oxidation and ultra-violet radiation, high optical clarity with little or no color, high bond strength to a variety of substrates, and versatility of formulation for cohesive strength, heat resistance, and solvent or chemical resistance. Acrylic pressure-sensitive adhesives can be prepared with solution or latex polymerization techniques having approximate molecular weights of less than $10^5$ or greater than $10^6$ with solution polymers comprising lower-molecular weight polymers.

As a result of their beneficial attributes, acrylic pressure-sensitive adhesives find utility in a wide variety of applications, including the graphic arts and for use in fabricating decals, labels, tapes, membrane switches, medical devices, and other protective and masking works. The flammability of adhesives is of concern in some applications, however, including electronic devices and appliances, for electrical tape, and in fabricating flexible optical circuits or multi-wire boards. A challenge with pressure-sensitive adhesives for use in such applications has been developing materials that have optimal or desired levels of adhesive properties and yet are non-flammable. Pressure-sensitive adhesives based on acrylates or polyacrylates, for example, have excellent pressure-sensitive adhesive properties, but they are also flammable.

One common approach in reducing the flammability of a pressure-sensitive adhesive is to blend combustion-inhibiting additives in the adhesive. Many flame-retardant additives contain bromine, such as brominated diphenyl or brominated diphenyl oxide compounds. Decabromodiphenyl oxide often is used, for example, which has good flame-retardant properties in light of its high bromine content. Another commonly-used additive is antimony trioxide, which may be used in combination with halides, such as titanium tetrachloride. Halogen radicals provided by these additives react to form hydrogen halides which interfere with the radical chain mechanism in the combustion process, thereby breaking the combustion cycle. Antimony acts as a synergist to increase the efficacy of the halides.

However, adding combustion-inhibiting materials may disrupt the sensitive balance of the properties of the adhesive, such as tack, cohesive strength, solvency, and stability. Typical flame retardant systems, such as those based upon decabromodiphenyl oxide and antimony oxide, tend to settle out of acrylic coatings and adhesives, and they opacify the polymer and detract from its adhesive properties.

Aside from the halogen-containing flame retardants, phosphates also have been used to develop flame retardants, particularly condensed-phase flame retardants in oxygen containing polymers. See M. Robert Christy, Standards, Bans and Flame Retardants, PLASTICS COMPOUNDING (September/October 1993), at 59. A phosphate-containing pressure-sensitive adhesive is disclosed in U.S. Pat. No. 3,515,578, issued Jun. 2, 1970 to Tomita, et al., entitled "Pressure Sensitive Adhesive Tape," and assigned to Minnesota Mining and Manufacturing Co (3M). The 3M patent describes pressure-sensitive adhesives involving polyacrylates modified by tris-(halogenated alkyl) phosphates and antimony trioxide, and describes as preferred tris-(halogenated alkyl) phosphates with dibromo-substituted alkyls having three carbon atoms and, in particular, tris(2, 3-dibromopropyl)phosphates, although this phosphate has been determined to be carcinogenic and banned by the U.S. Environmental Protection Agency. The use of brominated-phosphates as a flame retardant is mentioned in Spotlight, Customer Demands: Synergistic Flame-Retardant Systems, PLASTICS COMPOUNDING (January/February 1994), which discloses a study relating to a compound comprising 16.7% brominated polycarbonate oligomer and 12% triphenyl phosphate or 6% brominated phosphate (60% bromine, 4% phosphorus). In this instance, the phosphates are used as fillers by blending in the polycarbonate compound.

Use of phosphates has been discouraged as adversely affecting the mechanical properties of the materials particularly when present as a filler. See Favstritsky et als., U.S. Pat. No. 5,100,986, entitled "Flame Retardant Brominated Styrene-Based Coatings," issued Mar. 31, 1992, which is hereby incorporated by reference. While exhibiting good flame retardancy and clarity, the phosphates tend to be insoluble in water, and when used in conjunction with a polymer, they tend to plasticize the polymer and migrate to the surface, depending on their compatability with the polymer and other additives, i.e., certain phosphates will greatly weaken the cohesive properties of the adhesives.

An advantageous approach for developing a flame-retardant pressure-sensitive adhesive is to react a flame retardant into the polymer backbone, as compared with using additive flame retardants blended in the polymer. There has been limited success with such integrated polymers, as discussed in Wang & Favstritsky, Flame-Retardant Brominated Styrene-Based Polymers, JOURNAL OF COATINGS TECHNOLOGY, Vol. 68, No. 853 (February 1996), pp. 41–47, at page 41. For example, copolymers of acrylonitrile, vinylidene chloride, and vinyl chloride are of this type and have both adhesive and fire-retardant properties. However, chlorine is less effective than bromine or phosphorous in producing flame-retardant properties and thus, such chlorinated compounds are not as effective as compositions incorporating bromine or phosphorous. Also, chlorinated polymers are less thermally and hydrolytically stable than brominated polymers.

The development of flame-retardant polymers involving dibromostyrene is described in Wang & Favstritsky, JOURNAL OF COATINGS TECHNOLOGY, cited above, and Wang & Favstritsky, Novel Flame Retardant Dibromostyrene-Based Lattices: Synthesis, Characterization, and Applications, presented at the Waterborne, High-Solids, and Powder Coatings Symposium (Feb. 22–24, 1995) (hereinafter "Symposium Paper"). Wang et al. discloses polymers of dibromostyrene and butadiene or dibromostyrene and a plurality of monomers selected from the group consisting of styrene, butadiene, methacrylic acid, ethyl acrylate, butyl acrylate, methyl methacrylate, 2-ethylhexyl acrylate, and itaconic acid, with the choice of monomer depending on the application. See Symposium Paper at 1. See also U.S. Pat. No. 5,066,752, to Favstritsky et al., issued Nov. 19, 1991, entitled "Flame Retardant Brominated Styrene-Based Polymers"; U.S. Pat. No. 5,100,986, cited above; U.S. Pat. No. 5,290,636 to Rose et als. issued Mar. 1, 1995, entitled "Flame Retardant Brominated Styrene-Based Coatings"; and U.S. Pat. No. 5,438,096 to Wang et als. issued Aug. 1, 1995, entitled "Flame Retardant Brominated Styrene-Based Latices," all of which were assigned to Great Lakes Chemical Corp. and are incorporated herein by reference.

One application for use of flame-retardant pressure-sensitive adhesives involves optical circuit devices. Optical circuits are tested for flame retardancy pursuant to standards known in the industry for measuring the flammability of plastics used in electronic devices and appliances, namely, the Underwriters' Laboratory (UL) 94 standards. The UL standards are well known and also are described in M. Robert Christy, Standards, Bans, and Flame Retardants, PLASTICS COOMPOUNDING (September/October 1993), at pp. 59–61. The UL 94 vertical (UL94V) standards have been applied to optical circuit devices, including the UL94V test and the 94VTM test, with the latter test (94VTM), applicable for thinner materials prone to distortion.

A difficulty with adhesives used in optical circuits has been developing materials that meet UL 94 ratings while maintaining desired levels of adhesiveness. For circuits to meet desired levels of flame retardancy, combustion-inhibiting additives at greater than twenty-five percent of the total solids would be required. This would decrease the tack of the adhesives to the point that they could no longer meet desired fiber placement tolerances. Adhesives used in optical circuit devices should have a peel strength of at least two pounds per inch; should have sufficient tack so a curved fiber with a radius of one inch will be held in place without allowing the fiber to relax and straighten itself out, and will be held in place to plus or minus 1 mil after being pressed into the adhesive at about a one-quarter pound force; should remain stable when exposed to standard environmental testing as is known in the industry; should not contain reactive constituents that might degrade the composite; and should not require the use of special procedures, such as gloves or ventilation, to handle the adhesive at temperatures up to 100 degrees Centigrade.

Accordingly, there remains a need for improved non-flammable pressure-sensitive adhesive in which flame retardants are reacted into the polymer backbone having high flame retardant properties with good adhesion, cohesion, and tack. There particularly remains a need for such an adhesive that may be used in fabricating flexible optical circuit devices. The adhesives of this invention satisfy this need, although they find utility in other applications as well, such as electrical tape or in electronic devices and appliances. Further advantages may appear more fully upon consideration of the description given below.

SUMMARY OF THE INVENTION

The invention comprises an adhesive composition comprising a solution or emulsion polymerization of acrylic esters, dibromostyrene, and vinyl phosphonic acid, with or without acrylic acid, and having dispersions of antimony trioxide blended in the polymer. In a preferred embodiment, a latex adhesive composition is fabricated with 2-ethylhexyl acrylate, dibromostyrene, n-butyl acrylate, and vinyl phosphonic acid, remixed with $Sb_2O_3$ preferably in an approximate ratio of 100 parts co-polymer per about 8–10 parts $Sb_2O_3$. Preferred compositions are those containing at least about 11.6% to 15.5% bromine and about 0.25 to 2.5% phosphorus.

Pressure-sensitive adhesives according to the invention further comprise compositions represented by the formula (I):

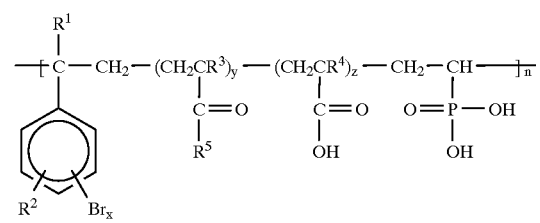

in which n is an integer having a value of about 1 to 200, x=1 to 4, y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. When latex (emulsion) polymerization techniques are employed, z=0.

Pressure-sensitive adhesives according to the invention further comprise compositions represented by the formula (II):

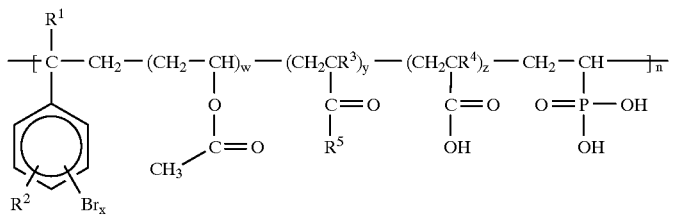

in which n is an integer having a value of about 1 to 200, x=1 to 4, w=1 to 4; y=1 to 5, z=0 to 1, $R^2$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. With latex (emulsion) polymerization techniques, z=0.

The polymers of the invention have a weight average molecular weight of at least about 75,000 and glass transition temperatures ($T_g$) of about −15° C. to −55° C.

BRIEF DESCRIPTION OF THE FIGURES

For a better understanding of the invention, reference is made to the accompanying figures, in which.

DETAILED DESCRIPTION OF THE INVENTION

Figure 1:
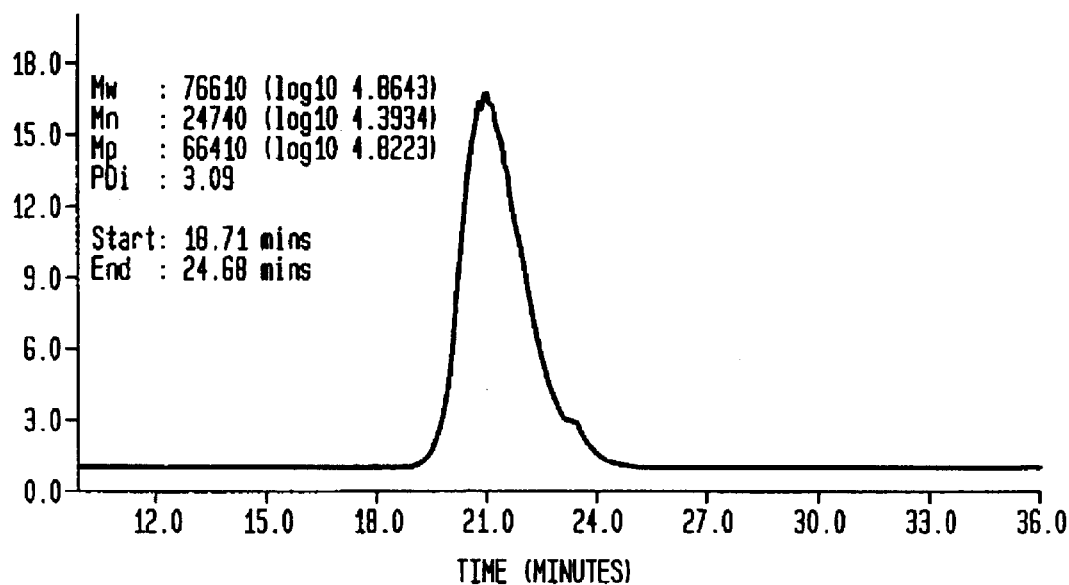
FIG. 1 reflects the results of a gel permeation chromatography analysis for the solution polymer prepared following EXAMPLE 3 hereof and FIG. 2 reflects the results of a differential scanning calorimetry analysis for the solution polymer of FIG. 1.

The invention provides a flame-retardant pressure sensitive adhesive in which the flame retardancy is reacted into the backbone of the polymer. With this invention, a series of acrylic polymers based on dibromostyrene (or dibromoethenylbenzene) and incorporating phosphorous are provided. In general, the adhesive composition comprises a solution or emulsion polymerization of dibromostyrene, acrylic esters, and vinyl phosphonic acid. With solution polymerization, acrylic acid also is incorporated into the polymerization mixture. Preferred acrylic esters comprise butyl acrylate and 2-ethylhexyl acrylate. However, other acrylates and/or methacrylates may be used, including any one or more of methyl acrylate, methyl methacrylate, ethyl acrylate, n-butyl acrylate, n-butyl methacrylate, hexyl acrylate, isooctyl acrylate, and vinyl acetate. The resultant copolymer is remixed with dispersions of antimony trioxide ($Sb_2O_3$) preferably in an approximate ratio of 100 parts co-polymer per about 8–10 parts $Sb_2O_3$.

The high bromine content of the adhesive provides good flame retardant properties, while the aromaticity of the compound assures good thermal and hydrolytic stability. The phosphorus content increases the efficacy of the flame retardant to the point where only relatively small quantities of $Sb_2O_3$ may be needed to obtain the desired levels of flame retardancy, such that the adhesive tack of the composition is maintained at a level suitable for use in optical circuits or other applications posing similar constraints. The best combination of flame retardancy and adhesive qualities is obtained when emulsion polymerization is used. Emulsion polymers are preferred to solution polymers due to the reaction kinetics. Dibromostyrene tends to react more slowly with acrylic esters in solution than in emulsion and tends to form dibromostyrene homopolymers rather than desired copolymer compositions.

Preferably, with emulsion polymerization 2-ethylhexyl acrylate is the predominating acrylic ester, with the ratio of 2-ethylhexyl acrylate to butyl acrylate approximating 2:1. With solution polymerization, roughly equal parts of 2-ethylhexyl acrylate and butyl acrylate have proved advantageous. Small quantities of vinyl phosphonic acid are incorporated into the emulsion or solution polymerization mixture, with the percentage of vinyl phosphonic acid being about 1 to 5% of the total monomers charged. Preferred compositions for emulsion polymerization have approximate by weight percentages as follows: 1 percent vinyl phosphonic acid, 50 percent 2-ethylhexyl acrylate, 26 percent n-butyl acrylate, 23 percent dibromostyrene. For solution polymerization, preferred by weight percentages comprise 5 percent vinyl phosphonic acid, 35 percent 2-ethylhexyl acrylate, 35 percent n-butyl acrylate, 23 percent dibromostyrene, and 2 percent acrylic acid.

The composition obtained with the polymerization can be represented by the formula (I):

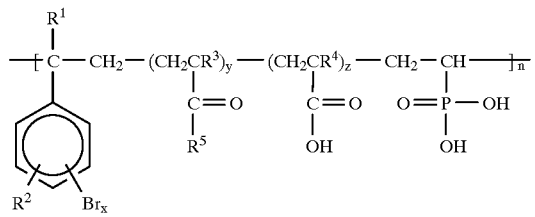

in which n is an integer having a value of about 1 to 200, x=1 to 4, y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. When latex (emulsion) polymerization techniques are employed, z=0.

The composition obtained with the polymerization involving a monomer of vinyl acetate can be represented by the formula (II):

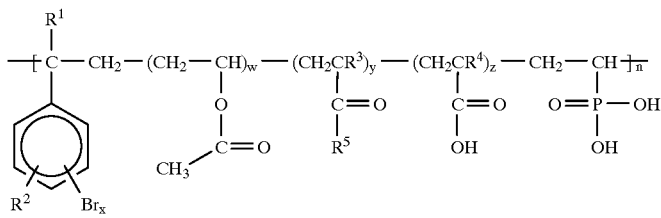

in which n is an integer having a value of about 1 to 200, x=1 to 4, w=1 to 4; y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl. With latex (emulsion) polymerization techniques, z=0.

The specified monomers advantageously can be used in the ratios specifically stated herein or admixed with vinyl acetate and acrylic esters (such as acrylate and methacrylate esters) in such proportions as to provide copolymers having glass transition temperatures ($T_g$) of about −15° C. to −55° C. Preferably latex polymers are used with a weight average molecular weight of at least about 150,000, or solution polymers with a weight average molecular weight of approximately 76,000. The bromine content is preferably at least about 11.6 to 15.6 percent, and the phosphorus content is preferably about 0.25 to 2.5 percent.

A suitable dibromostyrene monomer for use in the polymerizations is available from Great Lakes Chemical Company in West Lafayette, Ind., under the tradename Great Lakes DBS. It is an amber liquid containing 58 to 59 percent bromine with a formula weight of 261.9. It assays as 99% brominated styrenes. The dibromostyrene monomer contains about 85 percent dibromostyrene, 10–15 percent monobromostyrene (primarily parabromostyrene), and 5–6 percent tribromostyrene by weight.

Polymerization preferably is carried out at increased temperatures, that is, at about 80 to 100 degrees Centigrade. Techniques for polymerization are well known. Suitable initiators include those used for free radical polymerization, such as persulfates, peroxides, or azo or diazo compounds. Suitable emulsifiers include anionic, cationic, nonionic, or amphoteric. A bath of deionized water or solvent, such as toluene, is charged and flushed with nitrogen, and the monomers (comprising dibromostyrene, the acrylic esters, vinylphosphonic acid, and acrylic acid), are pumped into the bath over a period of time while the composition is stirred or rotated at increased temperature. Crosslinking additives may be added and the finished polymer mixed with appropriate dispersions of $Sb_2O_3$. Care should be taken that the $Sb_2O_3$ is well dispersed.

For optical circuit applications, the adhesive may be cast on a silicone release liner. The wet adhesive films can be air dried and cured at temperatures of 120–250 degrees Fahrenheit, and then transferred to a KAPTON™ film or other suitable film used for optical circuits. Preferably, the adhesive layer has a thickness of 1 mil dry, but can be coated from less than 0.5 to up to 5.0 mils dry.

The invention now will be further described with reference to the following Examples. However, it is understood that these Examples are illustrative and not limiting in nature.

EXAMPLE 1

An emulsion polymerization was carried out using 1% vinyl phosphonic acid (18 g), 50% 2-ethylhexyl acrylate (900 g), 26% n-butyl acrylate (468 g) and 23% dibromostyrene (414 g) (percentages are by weight).

A reactor was charged with 954 g deionized water and purged with nitrogen while heating to 80° C. A polymerization initiator consisting of 9.0 g ammonium persulfate dissolved in 45.0 g deionized water was added to the reactor. Fifteen minutes following addition of the initiator, a monomer pre-emulsion was started consisting of 414 g deionized water, 45.0 g RHODAPEX-CO-436 (a tradename for an ammonium salt of sulfated nonylphenoxy(ethyleneoxy) ethanol available from Rhone-Poulenc), 14.4 g aqua ammonia (29%), 18.0 g vinyl phosphonic acid, 900 g 2-ethylhexyl acrylate, 468 g n-butyl acrylate, and 414 g dibromostyrene. This pre-emulsion was added evenly over a 4 hour period (9.47 g per minute), with the reactor under nitrogen. The reactor bath was maintained at about 81 plus/minus 1 degrees C. The reactor contents were maintained at 80.1 plus/minus 1 degrees C. during the monomer feed and agitation was varied from 150 to 200 rpm as needed.

108 g deionized water was added at the end of the feed as a rinse, and the reactor was held at 80° C. for an additional 45 minutes. The emulsion was then cooled to 50° C. Four chasers were added as follows:

| Chaser composition | #1 | #2 | #3 | #4 |
|---|---|---|---|---|
| Deionized water, g | 6.01 | 6.01 | 6.01 | 6.01 |
| t-Butyl hydroperoxide, 70%, g | 0.83 | — | 0.83 | — |
| Sodium formaldehyde sulfoxylate, g | — | 0.83 | — | 0.83 |

Chaser #1 was added after cooling to 50° C. Chaser #2 was added five minutes following chaser #1. Chaser #3 was added 20 minutes following chaser #2. Chaser #4 was added 5 minutes following chaser #3.

The reactor was maintained at 50° C. for a total of 60 minutes, starting 20 minutes after the addition of chaser #2. The finished emulsion was cooled to about 35° C., and 5.63 g of KATHON LX (1.5%) BIOCIDE (available from Rohm & Haas Company), a 4-izothiazoline-3-one compound used as a microbiocide, was added prior to kegging.

The total reactor charge was 3422.39 g. The latex was 53.6% non-volatile at a viscosity of about 20–34 cps at 25° C., with a pH of 5.91. The average particle size was measured at about 295 nanometers. Filterable solids (coagulum) were 3 ppm on 100 mesh, 9 ppm on 200 mesh, and 15 ppm on 325 mesh.

EXAMPLE 2

2326 g of the product from Example 1 was compounded with 6.3 g 29% $NH_4OH$, 4.65 g DREWPLUS L-475 (a tradename for a non-ionic defoamer comprising a blend of mineral oils and silica derivatives sold by Drew Industrial Division), 94.6 g ALCOGUM L-31 (a tradename for an acrylic emulsion copolymer-thickener sold by Alco Chemical Corp.), and 20 g deionized water. The product exhibited 52.1 percent non-volatility with a viscosity of 2015 cps at 25 degrees C., and pH of 8.41. This product had the properties listed below in Table 1, Column 1. The compounded product was dispersed with $Sb_2O_3$ in a ratio of 100 parts co-polymer solids per 12 parts $Sb_2O_3$ solids (192.3 g co-polymer compounded in the manner described above) was mixed with 20 g AQUAMIX 104 (a tradename for an aqueous dispersion containing 60% $Sb_2O_3$ sold by Harwick Chemical), for a yield of 212.3 g. The wet adhesive was cast on a bleached kraft silicone release liner, air dried for 15 minutes, cured for 6 minutes at 200 degrees F, and transferred to a 2 mil KAPTON™ film. The adhesive-coated KAPTON™ films were tested for UV 94 ratings. Of twenty samples tested, six obtained a VO rating and 13 obtained a V1 rating. The resultant product had the adhesives properties listed below in Table I, column 2.

EXAMPLE 3
Intermediate Polymer Solution A

A solution polymerization was started using 5% vinyl phosphonic acid (60 g), 35% 2-ethylhexyl acrylate (420 g), 35% n-butyl acrylate (420 g), 23% dibromostyrene (138 g), and 2% acrylic acid (24 g), with 520.5 g toluene and 1.25 g TRIGANOX 29 (1,1-di-(t-butylperoxy)-3,3,5-trimethylcyclohexane), dissolved in 50 g toluene. This solution was added to a 2 and one-half gallon stainless steel reactor purged with nitrogen with agitation (120–130 rpm).

The reactor contents were heated to 103/104° C. and held at 104° C. for 15 minutes. A delayed monomer solution feed consisting of 60 g vinyl phosphonic acid, 420 g 2-ethylhexyl acrylate, 420 g n-butyl acrylate, 414 g dibromostyrene, and 24 g acrylic acid, with 668.9 g toluene and 1.51 g TRIGANOX 29, dissolved in 50 g toluene were then added evenly to the reactor (114 g/min.), over a three hour period with agitation while maintaining a nitrogen flow and a reactor contents temperature of 100 plus/minus 1 degrees C. The reaction was continued at this temperature for an additional 6 hours after the delayed monomer solution was added.

The reaction was completed with three individual booster additions each composed of 2.0 g TRIGANOX 29 dissolved in 50 g toluene added at three hour intervals beginning at the completion of the 6 hour hold. Three and one-half hours after the third booster was added, the reactor was cooled to about 60° C. and 515.4 g isopropanol was added. The solution polymer was cooled further to under 40° C. and kegged.

The uncompounded solution polymer base (solution polymer base A) had a solids content of 54.1% and a Gardner Holdt viscosity of 14.9 stokes (about 1640 cps), at 25 C. The total materials charged comprised 4363.56 g.

Intermediate Polymer Solution B

The solution polymer base A was mixed with metal chelate cross-linking additives as follows: 2.4 g aluminum acetylacetonate (0.6% polymer solids), 3.7 g 2,4-pentanedione (about 1.5 times the aluminum acetylacetonate charged), and 24.5 g tolune (10 times the aluminum acetylacetonate charged), were predissolved and added as a 30.6 g masterbatch with mixing to 765.5 g of the intermediate polymer solution A (about 409.3 g solids). This product had the adhesives properties listed below in Table I, column 3.

Final Compounded Polymer Solution C

The intermediate polymer solution B was compounded with $Sb_2O_3$ dispersons at a ratio of 100 parts resin solids to 10 parts $Sb_2O_3$. 11.8 g Harwick Mastermix antimony oxide containing 85% $Sb_2O_3$ (about 10 g $Sb_2O_3$) was added to 192.3 g of intermediate polymer solution B containing the cross-linking additives (about 100 g solids), with mixing until homogenous. The resultant product had the adhesives properties listed below in Table I, column 4.

Figure 2:
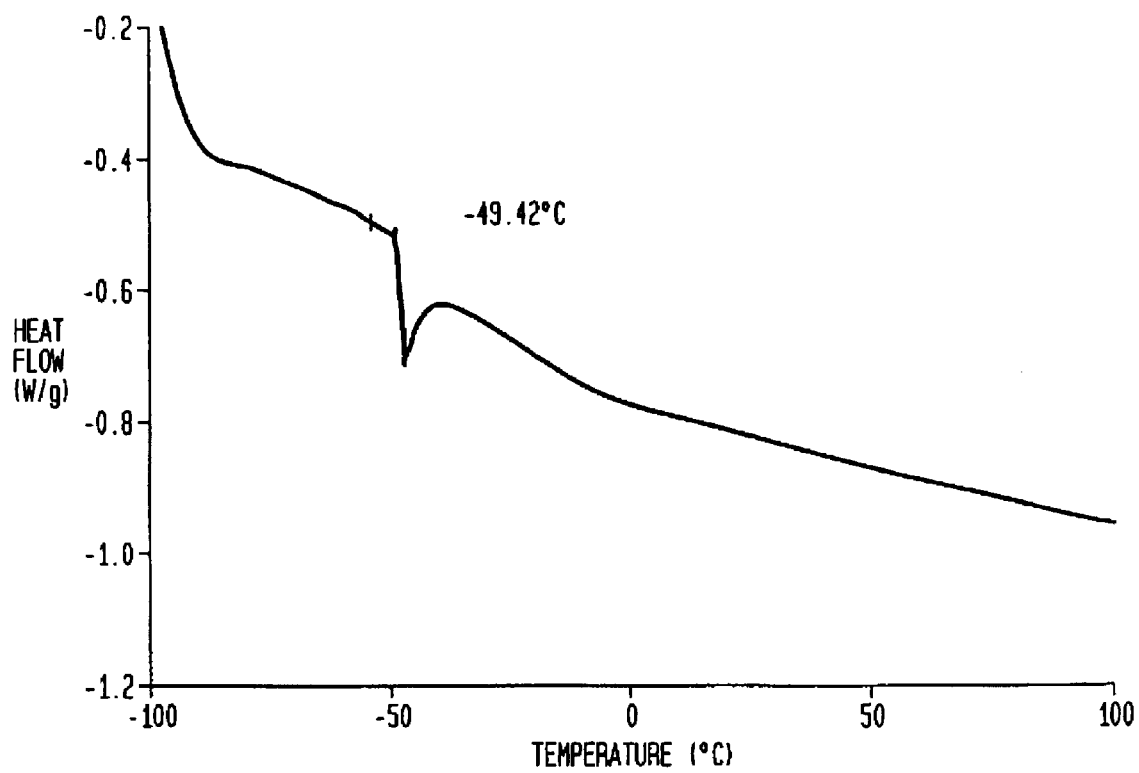

The solution polymer of EXAMPLE 3 was analyzed using gel permeation chromatography (GPC) and differential scanning calorimetry (DSC) analysis. The liquid sample for GPC was prepared by adding 0.02 g of the solution polymer to 10 ml tetrahydrofuran; this was allowed to stand at 25° C. for 24 hours to dissolve the polymer, filtered through a 45 $\mu$m filter, and injected with a 100 $\mu$l injection into a Waters HMW 6e/HMW 7 column set at 25° C. with a mobile phase of 1 ml/min THF. The results are reported in FIG. 1 and reflect a molecular weight of 76,610. DSC reflected a $T_g$ of −49 extrapolated from a thermal profile of 20° C./minute from −100 to 250° C. as reported in FIG. 2.

As noted, the copolymers and intermediates obtained through the processes described in Examples 1–3 were cast onto release liners, air dried for fifteen minutes, and cured at about 200° F. to comprise 1 mil adhesive films, which were then transferred to 2 mil MYLAR™ substrates and tested for flame retardancy and adhesive, cohesive, and tack properties. The compositions were found to have the adhesive properties listed in Table I below:

TABLE I

PRESSURE SENSITIVE ADHESIVE PROPERTIES OF EXAMPLES I–III
1 MIL DRY ADHESIVE FILMS TRANSFER COATED TO 2 MIL TYPE A MYLAR
CURE: 15 MIN. AIR DRY 6 MIN. @ 200° F.

|  | EXAMPLE 2 (w/o $Sb_2O_3$) | EXAMPLE 2 (with $Sb_2O_3$ at 100/12 ratio) | EXAMPLE 3 (w/o $Sb_2O_3$) | EXAMPLE 3 (with $Sb_2O_3$ added 100/10 ratio) |
|---|---|---|---|---|
| Adhesive Properties: | | | | |
| PSTC-1, 180° Peel Adhesion, lbs./in | | | | |
| Immediate Dwell (Aug.) | | 2.0 C | 2.6 C | 2.5 C |
| 15' Dwell (avg.) | 3.5 C/4.0 PT | 2.0 C | 3.2 C | 2.9 C |
| 24 hr. Dwell (Avg.) | 7.1 S/6.2 PT | 2.6 C | 3.6 C | 3.7 C |
| Tack Properties: | | | | |
| PSTC-5, Quick Stick (Avg.) | | 0.9 C | 0.7 C | 1.6 C/0.7 Z |
| Loop Tack, lbs. (Avg.) | 0.8 | | | |
| PSTC-7, Shear Adhesion, hrs. | | | | |

TABLE I-continued

PRESSURE SENSITIVE ADHESIVE PROPERTIES OF EXAMPLES I–III
1 MIL DRY ADHESIVE FILMS TRANSFER COATED TO 2 MIL TYPE A MYLAR
CURE: 15 MIN. AIR DRY 6 MIN. @ 200° F.

|  | EXAMPLE 2 (w/o $Sb_2O_3$) | EXAMPLE 2 (with $Sb_2O_3$ at 100/12 ratio) | EXAMPLE 3 (w/o $Sb_2O_3$) | EXAMPLE 3 (with $Sb_2O_3$ added 100/10 ratio) |
|---|---|---|---|---|
| 1" × ½" × 1000 g (Avg.) | 0.05 |  |  |  |
| ½" × ½" × 500 g (Avg.) |  | 0.11 S | 0.97 S | 0.46 S |
| ½" × ½" × 1000 g (Avg.) |  |  | 0.25 S | 0.1 S |

Adhesive Failure Code
C = Clean, Adhesive Failure
PT = Partial Transfer
S = Split
Z = Zipper It is understood that the embodiments described herein are merely exemplary and that a person skilled in the art may make variations and modifications without departing from the spirit and scope of the invention. All such variations and modifications are intended to be included within the scope of the appended claims.

We claim:

1. An adhesive composition comprising the polymerization of one or more acrylic esters selected from the group consisting of butyl acrylate, 2-ethylhexyl acrylate, methyl acrylate, methyl methacrylate, ethyl acrylate, n-butyl acrylate, n-butyl methacrylate, hexyl acrylate, isooctyl acrylate and vinyl acetate; a monomer of dibromostyrene; and a monomer of vinyl phosphonic acid.

2. The composition of claim 1, further comprising antimony trioxide ($Sb_2O_3$) blended with the polymer in an approximate ratio of 100 parts polymer per 6 to 15 parts $Sb_2O_3$.

3. The composition of claim 1, in which the polymerization comprises a solution polymerization and about one to five percent acrylic acid by weight.

4. The composition of claim 1, wherein the acrylic esters comprise 2-ethyl hexyl acrylate and n-butyl acrylate.

5. The composition of claim 1, wherein the polymer comprises at least about 11.6 to 15.6% bromine and about 0.25 to 2.5% phosphorus by weight.

6. The composition of claim 4, comprising the emulsion polymerization of 2-ethylhexyl acrylate and n-butyl acrylate, wherein the ratio of 2-ethylhexyl acrylate to n-butyl acrylate is about 2:1.

7. The composition of claim 3, comprising the solution polymerization of 2-ethylhexyl acrylate and n-butyl acrylate, wherein the ratio of 2-ethylhexyl acrylate to n-butyl acrylate is approximately 1:1.

8. The composition according to claim 1 having a weight average molecular weight of at least about 75,000 and a glass transition temperature ($T_g$) of about –15° C. to –55° C.

9. The composition according to claim 1, comprising about 1 to 5% by weight vinyl phosphonic acid.

10. The composition of claim 6, comprising about 1 percent by weight vinyl phosphonic acid, 50 percent by weight 2-ethylhexyl acrylate, 26 percent by weight n-butyl acrylate, and 23 percent by weight dibromostyrene.

11. The composition of claim 7, comprising about 5 percent by weight vinyl phosphonic acid, 35 percent by weight 2-ethylhexyl acrylate, 35 percent by weight n-butyl acrylate, 23 percent by weight dibromostyrene, and 2 percent by weight acrylic acid.

12. A pressure-sensitive adhesive comprising a polymer represented by the formula:

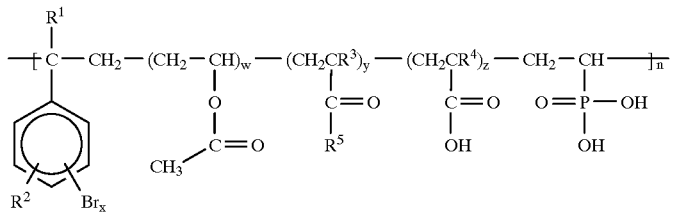

in which n is an integer having a value of about 1 to 200, x=1 to 4, w=0 to 4, y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl.

13. The pressure-sensitive adhesive of claim 12, wherein w=1 to 4 and comprising the polymerization of a vinyl acetate monomer.

14. A pressure-sensitive adhesive comprising a polymer represented by the formula:

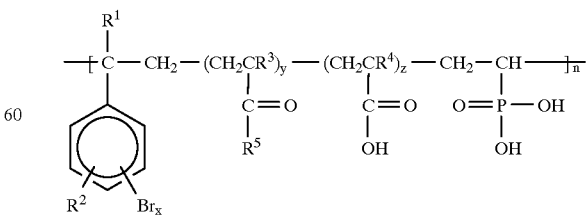

in which n is an integer having a value of about 1 to 200, x=1 to 4, y=1 to 5, z=0 to 1, $R^1$ is hydrogen or methyl; $R^2$ is hydrogen or an alkyl having from one to four carbon atoms; $R^3$ and $R^4$ taken independently of each other $R^3$ and $R^4$ is hydrogen or methyl; $R^5$ taken independently of each other $R^5$ is selected from the group consisting of methyl, ethyl, n-butyl, hexyl, isooctyl, and 2-ethylhexyl.

15. The adhesive composition according to claim 12, further comprising dispersions of antimony trioxide blended with the polymer.

16. An adhesive composition according to claim 14 comprising an emulsion polymer in which Z=0.

17. The adhesive composition according to claim 12, further comprising antimony trioxide ($Sb_2O_3$) blended with the polymer in an approximate ratio of 100 parts polymer per 6 to 15 parts $Sb_2O_3$.

18. The adhesive composition according to claim 14, further comprising antimony trioxide ($Sb_2O_3$) blended with the polymer in an approximate ratio of 100 parts polymer per 6 to 15 parts $Sb_2O_3$.

19. The adhesive composition according to claim 1 comprising a polymer represented by the formula of claim 12.

* * * * *